July 14, 1936.  E. F. BACON  2,047,763
VIBRATION DAMPENER FOR AMMETERS
Filed Aug. 28, 1935
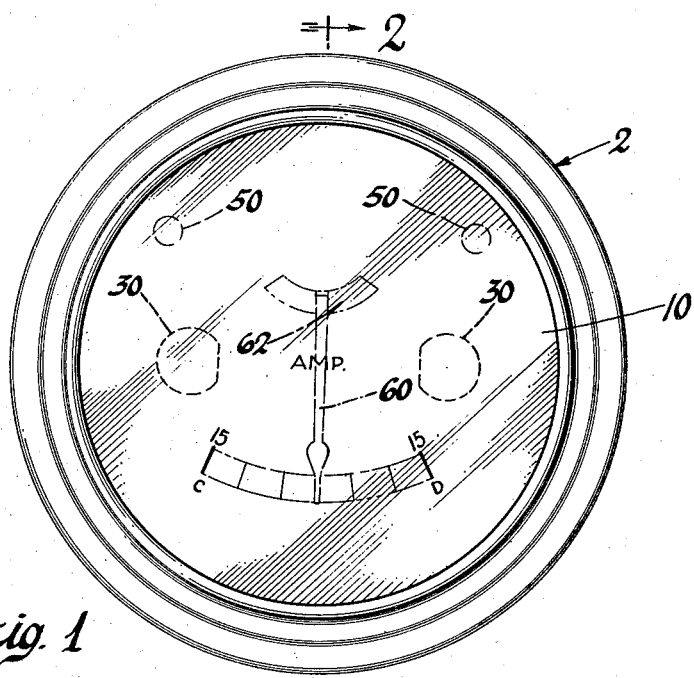
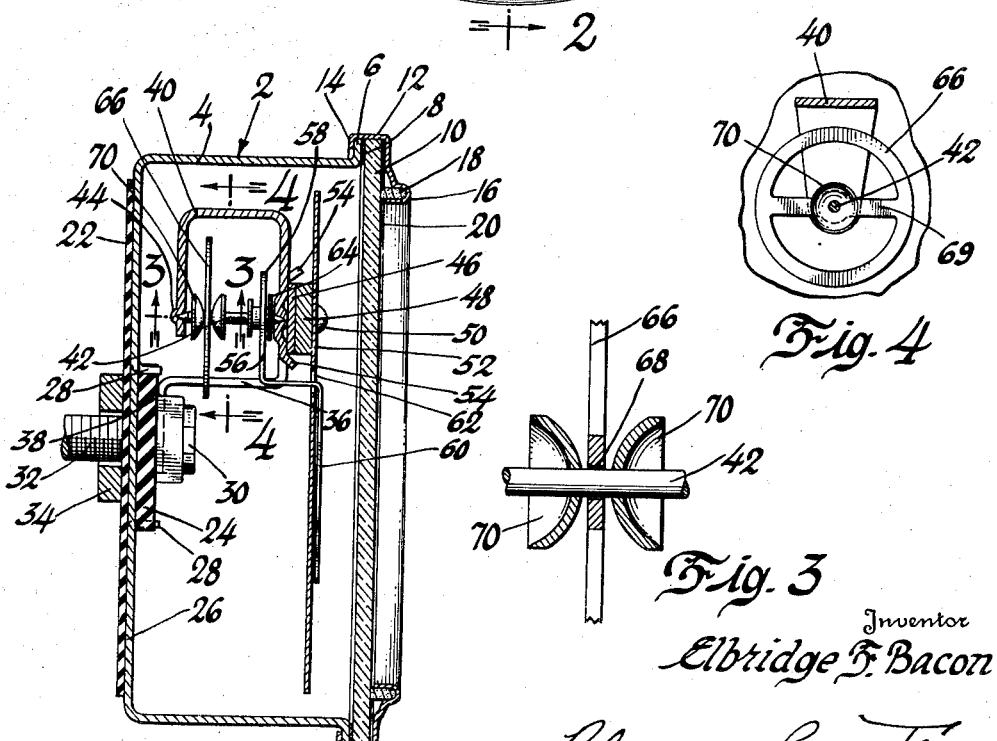
Inventor
Elbridge F. Bacon
By Blackmore, Spencer & Flint
Attorneys Patented July 14, 1936

2,047,763

UNITED STATES PATENT OFFICE 2,047,763

VIBRATION DAMPENER FOR AMMETERS

Elbridge F. Bacon, Flint, Mich., assignor to General Motors Corporation, Detroit, Mich., a corporation of Delaware Application August 28, 1935, Serial No. 38,154

5 Claims. (Cl. 73—151)

This invention relates to gages having a swingable pointer and has particular reference to a means for damping the oscillations of the pointer.

In ammeters, particularly those used on automotive vehicles, the mechanical and electrical vibrations cause the pointer to vibrate and at times render the reading of the instrument difficult. It is the object of the present invention to incorporate in the ammeter a construction which will reduce these oscillations or vibrations to a degree which makes them unobjectionable and which renders the reading of the instrument easy at all times.

To accomplish the object of the invention there is freely mounted on the rotating shaft of the ammeter a wheel or disc which is retained thereon between two dished, rounded, or convexoconcave members press fitted on the shaft. The rounded portion of the members faces the damping disc so that in case the instrument is slightly tilted the damping disc will also be tilted but the contact between the damping disc and the retaining member will be on a short arc because the contact between the two is on a curved surface.

In the prior art it is known to place a damping disc between two flat retaining discs, but these flat retaining discs cause too much friction between the damper and the shaft so that the object of the damper was largely nullified.

The instrument of the present invention is particularly useful where the gages must be mounted on an incline such as on the instrument boards of automotive vehicles or on motorcycles.

On the drawing

Figure 1 shows a face view of an ammeter to which the invention is applied.

Figure 2 is a section on the line 2—2 of Figure 1 showing the invention installed on the shaft of an ammeter.

Figure 3 is an enlarged detailed sectional view on the line 3—3 of Figure 2.

Figure 4 is an enlarged sectional detailed view on the line 4—4 of Figure 2.

Referring to the drawing, the numeral 2 indicates the ammeter as a whole. The ammeter comprises the cup-shaped casing 4 having a peripheral flange 6 at its edge. Over the flange 6 there is seated the anti-squeak or packing washer 8 on which there rests the glass 10. The glass is held in place on the casing 4 by means of the bezel 12 which has a flange 14 bent under the flange 6 of the casing 4. The inner periphery of the bezel 12 has a circular rib 16 formed thereon in which there is received the packing or anti-squeak material 18 which presses against the glass 10. A space 20 is allowed between the edge of the rib 16 and the glass 10.

On the bottom of the casing there is provided the sheet of insulation material 22 and on the inside thereof the block or strip of insulating material 24. The bottom 26 of the casing has the inwardly bent tongues or tabs 28 to retain the insulating material 24 in place, and suitable contact bolts 30 pass through openings in the bottom of the casing and through the insulating members 22 and 24 and extend beyond the casing as shown at 32 and serve as a means to secure the instrument in place. A suitable spacing washer 34 may be used.

Inside the casing 4 there is mounted the frame 36 which has the two feet 38 secured by the bolts 30 to the insulating block 24. The electric current from the source will pass through one of the bolts 30 through the frame 36 and out of the second bolt 30, the frame, therefore, forming the conductor. The frame is bent to U shape, shown at 40, and between the arms of the U there is pivoted the shaft 42. Suitable buttons 44 are pressed from the legs of the U-shaped portion to form bearings for the tapered ends of the shaft 42.

Toward the glass side of the case there is positioned on the frame 36 the tufting plate 46 and over the tufting plate there is placed the permanent magnet 48. The frame 40 has suitable tabs (not shown) bent therefrom into a plane level with the outer surface of the magnet 48 and suitable screws 50 pass through openings in the tabs and dial 52 to secure the dial in place over the frame 40 and magnet 48. Tongues 54 bent from the frame serve to position the tufting plate 46 and magnet 48.

A suitable pointer 56 is rigidly mounted on the shaft 42, the pointer having the balancing portion 58 at one end and the index 60 at the other. The dial is provided with an arcuate slot 62 through which the pointer extends. A suitable armature secured to the shaft 42 is indicated at 64. The parts so far described are in general conventional, and per se form no part of the invention.

In order to dampen the oscillations or vibrations of the index 60 of the pointer 56 a damper 66 is positioned on the shaft 42. The damper is concentrically mounted on the shaft and has its mounting opening 68 larger than the shaft diameter so that the damper is freely mounted on the shaft. The damper is in the form of a ring having the diametral portion 69. On either side of the damper 66 there is mounted a rounded or convexo-concave member 70 having its rounded side facing the damper 66. These members 70 are preferably press fitted on the shaft 42 so that they will be rigid with the shaft and definitely retain the damper 66 within confined limits. This construction confines the longitudinal movement of the damper 66 along the shaft 42 within very narrow limits while allowing a tilting movement within relatively wide limits. The extreme arc of the tilting movement is the arc between the peripheries of the members 70 struck from a point on the center line of the shaft as a center.

From an examination of Figure 3 it will be apparent that the greater portion of the friction between the damper 66 and the shaft 42 will be at the line of contact where the damper rests on the shaft. Should the damper 66 move against either of the members 70 the amount of increased friction will be relatively small because the contact between the members 70 and the damper 66 will be on an arc whereas if the member 70 were flat the contact would be over substantially the entire face of the retaining member and the damper. Where the instrument is mounted in an inclined position, such as on a motorcycle, the damper 66 likewise will be inclined and naturally will fall toward and rest on one of the retaining members 70. The friction between the damper 66 and the retaining member 70 in this case will not be very great because the line of contact will be a part of a circle so that more effective and delicate damping will be obtained.

I claim:

1. In a gage having a pointer mounted on a shaft, means rotatably to mount the shaft, a non-liquid damper member loosely mounted on the shaft, and means on the shaft to limit movement of the damper on the shaft, said means having a rounded surface adjacent the shaft to decrease the frictional resistance between the damper and the limiting means when in contact with each other.

2. In a gage having a pointer mounted on a shaft, means rotatably to mount the shaft, a non-liquid damper member loosely mounted on the shaft, and dished members secured to the shaft on opposite sides of the damper member to limit its movement, said dished formation decreasing the frictional resistance between the damper and the members when in contact with each other.

3. In a gage having a pointer mounted on a shaft, means rotatably to mount the shaft, a damper member loosely mounted on the shaft, and convex members secured to the shaft at opposite sides of the damper to limit its movement longitudinally of the shaft, the rounded exterior of said members facing the damper to limit the frictional resistance caused by contact between the damper and the convex members.

4. In a means for positioning a damper on a rotatable shaft, a pair of dished members secured to the shaft, one member on each side of the damper, the dished side of each member facing away from the damper.

5. In a gage having a pointer mounted on a shaft, means rotatably to mount the shaft, a non-liquid damper member loosely mounted on the shaft, said member having a central opening considerably larger than the shaft to enable said member to move longitudinally of the shaft or to tilt with reference thereto, and means on the shaft to limit the movement of the damper member longitudinally of the shaft within very narrow limits, said means being so constructed to enable the damper member in any of its positions to tilt within relatively wide limits with reference to the shaft and also to limit the tilting movement of the member relative to the shaft.

ELBRIDGE F. BACON.